(No Model.)
G. GATES.
SEPARATING SAND AND SLIMES.
No. 482,241. Patented Sept. 6, 1892.
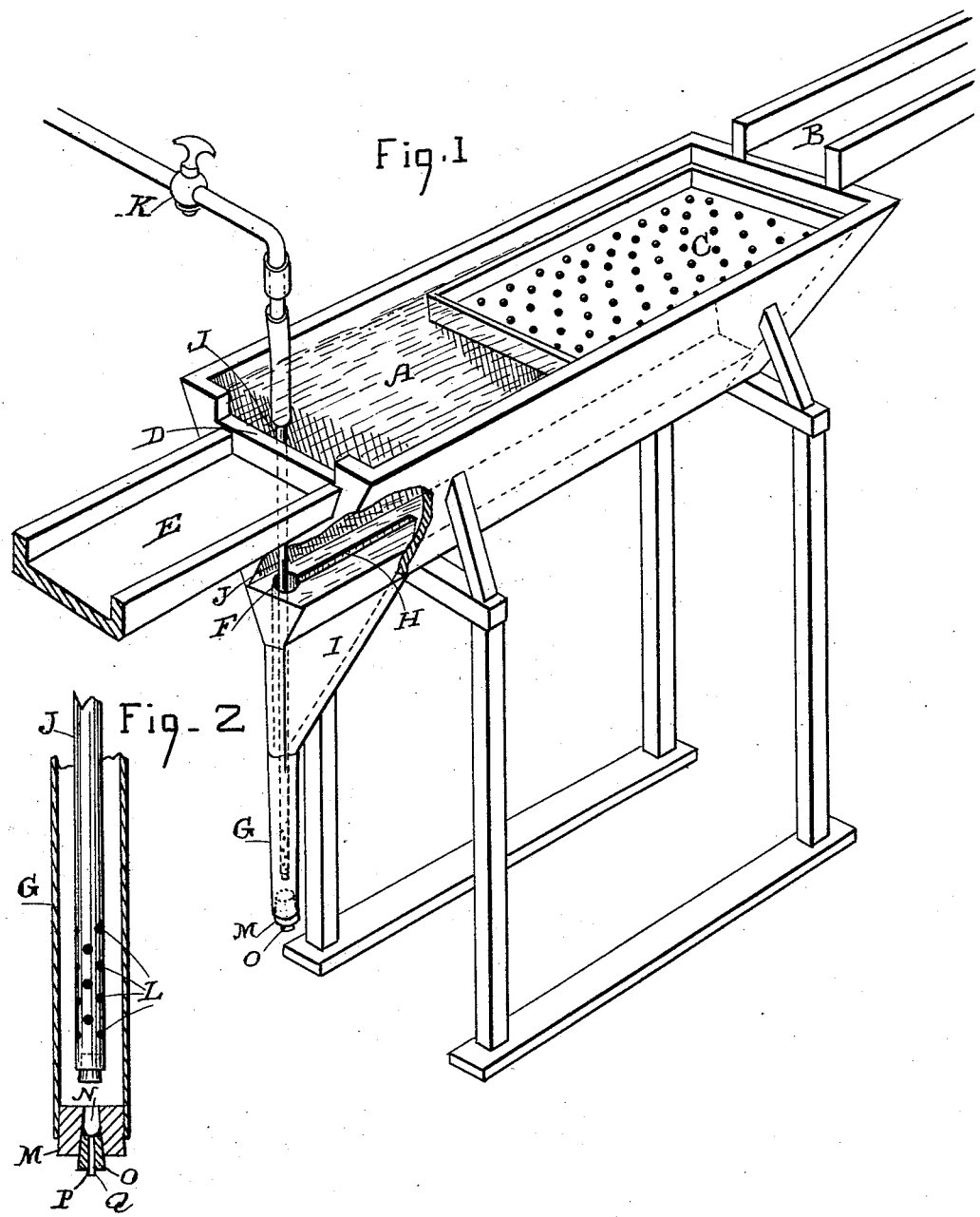

UNITED STATES PATENT OFFICE.

GEORGE GATES, OF JACKSON, CALIFORNIA.

SEPARATING SAND AND SLIMES.

SPECIFICATION forming part of Letters Patent No. 482,241, dated September 6, 1892.

Application filed January 5, 1892. Serial No. 417,081. (No model.)

*To all whom it may concern:*

Be it known that I, GEORGE GATES, a citizen of the United States, residing at Jackson, Amador county, State of California, have invented an Improvement in Separating Sand and Slimes; and I hereby declare the following to be a full, clear, and exact description of the same.

My invention relates to an apparatus for separating the slimes and sand from coarser material arising from the crushing of valuable ores.

It consists in certain details of construction, which will be more fully explained by reference to the accompanying drawings, in which—

Figure 1 is a perspective of my apparatus. Fig. 2 is an enlarged view of the vertical tubes, plugs, &c.

After the pulp has passed over the amalgamating-plates of a battery and such valuable precious metal as will adhere to the plates has been arrested there still remains a considerable portion which is valuable, which passes off in the form of extremely-light slimes, which will pass off in suspension in the water. In order to separate this from the heavier and coarser sands which still remain, I employ the apparatus here shown.

A is a tank having the sides V-shaped or inclining toward each other at a steep angle, so that any material will flow down the sides easily.

B is a sluice through which the material to be treated passes from the battery or other source of supply, and C is a tray having low sides and perforations made through the bottom of sufficient size to allow all the ordinarily-fine material to pass through it; but it will arrest any large particles or trash. This tray is placed at the upper end and near the top of the V-shaped tank A, so that the pulp and water are first received into the tray and pass through it into the tank beneath. The tank being filled with water, the heavier portion of the material will immediately settle and concentrate at the bottom. This tray C serves two purposes—the first one, as previously described, to separate the material, and the second, which is important, to prevent the rush of the inflowing material carrying it directly through to the lower and discharge end of the tank. The surface discharge from this tank takes place through a depression D, which is made in the top of the discharge end of the tank, and material which passes out through this is received in a sluice E and carried to a point where it is to be treated.

Through the bottom of the tank A is made a hole F, and this hole is in line with a pipe G, which forms a direct vertical continuation of it below the tank. From the hole F a slot H extends toward the central portion of the tank, so that the hole and slot resemble an exceedingly long and narrow keyhole.

Beneath the slotted portion H is a V-shaped channel I, the upper end of which is directly beneath the slot H, while the lower end opens into the pipe G, the bottom edge of the channel standing at an angle of forty-five degrees or greater to insure the flow of the material which may pass into it and prevent its becoming clogged therein.

J is a pipe which extends centrally down through the pipe G to a point near the bottom, and this pipe receives a supply of fresh water through a connecting-pipe and a cock K, by which the flow is regulated. The lower end of the pipe J is perforated, as shown at L, and the bottom of the pipe is closed, so that water will flow outwardly through these perforations.

The bottom of the pipe G has a stopper M, with a central hole N passing through the bottom. In this central hole N is a second stopper O, which has a hole P of small diameter passing through it. The top of the stopper O, which fits the open end, is made concave, so as to prevent any lodgment of particles upon it, and the stopper itself is made of glass or other suitable hard material which will resist the erosive action of the sharp sand which is continually passing, or the stopper may have a central bushing Q, of hard material, for this purpose.

The operation of the apparatus will then be as follows: The pulp flowing in through the sluice B passes into the perforated tray C, which is submerged in the water within the tank A, so that when the pulp is received the first action will be to break the force of the current of inflowing material and cause it to settle through the perforations in C into the quiet water in the tank A. Any material which is too coarse to pass through these perforations can be removed from time to time. The material falling into the water will flow down the sides of the tank upon the bottom, and the heavier portion, reaching the slot H, will pass down through the inclined channel I and into the pipe G. The lighter slimes remaining suspended in the water will eventually pass out through the depression D into the sluice E. Any portion which is light enough to be classed with these slimes and which it is desirable to carry off through the sluice E, but which may have fallen into the passage I and pipe G, will be constantly agitated and raised into the tank by the upward pressure of the current of water flowing out through the holes L in the pipe J. The opening P in the small stopper O is just large enough to allow a steady flow of the heavier particles, but without allowing them to flow freely and without allowing the water to flow freely. These heavier particles are prevented from settling and becoming solid by the constant flow of water through the holes L, before referred to, and at the same time any of the lighter slimes will be separated from them. The result of this operation is a very perfect separation of the slimes from the heavier and coarser particles in about the proportion of four of the heavier particles to one of the slimes, the latter being treated afterward by a separate concentrator, for which Letters Patent have already been issued to me.

Having thus described my invention, what I claim as new, and desire to secure by Letters Patent, is—

1. In an apparatus for separating slimes from heavy coarse particles, a tank with a narrow bottom and a narrow opening therein, an inclined triangular channel, the upper edge of which connects with the slot, an approximately-vertical receiving-pipe into which the lower angle of the channel discharges, a pipe through which water is delivered into the lower part of the receiving-pipe, and a discharge-opening in the bottom of the receiving-pipe, through which the heavy particles escape, while the lighter particles are carried upward to the tank and overflow by the water, substantially as herein described.

2. In an apparatus for separating slimes from heavy coarse particles, a settling-tank with a slotted inclined discharge-channel and a pipe into which the channel delivers its contents, a removable stopper at the bottom of the pipe, having a central hole, and a second stopper fitting the hole, and a discharge-opening through this stopper with a bushing of hard material to prevent wear, substantially as herein described.

3. An apparatus for separating sand and slimes, consisting of a tank having inclined sides, a tray with a flat perforated bottom situated in the upper part near the receiving end of the tank, a sluice through which the material is delivered into the tray to pass through the bottom, a depressed overflow-opening at the upper part of the discharge end, through which the slimes escape, a vertical opening from the bottom, an inclined slot and channel extending from said opening toward the center of the tank, whereby the heavier particles are caused to pass gradually into the channel and discharge from its lower angle, the water-pipe J, and a vertical receiving and separating pipe, substantially as herein described.

4. An apparatus for separating slimes and sand, consisting of the tank with inclined sides, the perforated receiving-tray at the upper end, the overflow-opening at the discharge end, a passage extending vertically down from the bottom near the discharge end, a slot in the bottom of the tank, and an inclined channel connecting with the slotted opening and pipe, as shown, stoppers fitted to the lower end of the pipe with a central discharge-hole, and a supplemental water-pipe of smaller diameter extending down into the main pipe, having perforations around its lower end, whereby the water is delivered into the pipe to agitate and separate the slimes and sand, substantially as herein described.

In witness whereof I have hereunto set my hand.

GEORGE GATES.

Witnesses:
S. H. NOURSE,
J. A. BAYLESS.